July 9, 1957          A. J. HANSEN          2,798,985

STEEP WAVE FRONT VOLTAGE GENERATING SYSTEM

Filed Dec. 23, 1952          2 Sheets-Sheet 1

Inventor
Alfred J. Hansen
by Didier Journeaux
Attorney

Inventor
Alfred J. Hansen
by Didier Jumeaux
Attorney

United States Patent Office 2,798,985
Patented July 9, 1957

2,798,985

STEEP WAVE FRONT VOLTAGE GENERATING SYSTEM

Alfred J. Hansen, Milwaukee, Wis., assignor to Allis-Chalmers Manufacturing Company, Milwaukee, Wis.

Application December 23, 1952, Serial No. 327,591

4 Claims. (Cl. 315—273)

This invention relates in general to improvements in control systems which control an electroresponsive device by means of a steep front voltage wave and more particularly, to an improved grid control system for electric valves.

It is well known in the art that the output of an electric valve of the vapor type may be regulated by controlling the magnitude of potential of its grid or by controlling the phase angle between the voltage on the plate and that applied to the grid. By biasing the grid of the vapor electric discharge device to a predetermined value with a voltage having an alternating wave form and by adjusting the phase angle of this wave with respect to the alternating plate voltage it is possible to have the valve start conducting at any predetermined time. However, it has been found that these prior art grid control systems have the disadvantage that the negative grid current which flows in the grid to cathode circuit shortly after the valve ceases to be conducting, appreciably affects the time at which the tube again starts conducting. Since the negative grid current is not constant but varies with the temperature of the valve, the deionization time of the vapor, and the design of each individual valve, a fixed compensation is not practically possible.

It has been found in accordance with this invention that an electric valve of the vapor type may be provided with a grid control circuit, the operation of which is not appreciably affected by the negative grid current of the valve. This circuit comprises a direct current saturable reactor, a capacitor, a resistor and an asymmetrical conductor.

It is therefore an object of the present invention to provide an improved circuit for producing a steep front voltage wave for controlling an electroresponsive device.

A further object of the present invention is to provide an improved grid control circuit in which the phase relation between the supply alternating voltage and the grid voltage is practically independent of ionization conditions in the tube.

A further object of the present invention is to provide an improved grid control circuit in which the phase relation between the supply alternating voltage and the grid voltage is independent of the amplitude of the supply voltage.

A still further object of the present invention is to provide an improved grid control circuit in which all the circuit elements are simple, static, electrical devices and which requires a small amount of control power.

Objects and advantages other than those mentioned above will become apparent from the following description when read in connection with the drawings in which.

Figure 1:
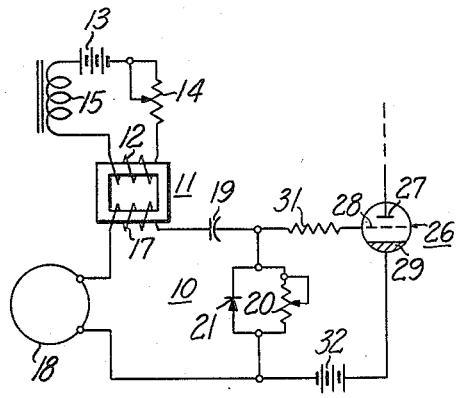
Fig. 1 shows diagrammatically the control circuit of the present invention used to control the operation of a vapor electric valve.

Referring to the drawing, in Fig. 1 the control circuit designated generally by reference character 10 comprises a saturable reactor 11 having a control winding 12 connected to a constant voltage supply. As shown, winding 12 is connected to a battery 13, through a variable resistor 14 and a reactor 15. Inductive winding 17 of reactor 11 is connected across a source 18 of alternating current through a capacitor 19 and a resistor 20. An asymmetrical current conductor 21, shown as a half wave rectifier of the dry disk type, is connected to form a parallel circuit arrangement with resistor 20. Because of the location of capacitor 19 in the circuit of Fig. 1 the time at which the reactor fires is made independent of variations in supply voltage. The parallel circuit arrangement of resistor 20 and asymmetrical current conductor 21 tends to cause unequal currents to flow in inductive winding 17 of reactor 11 on alternate half cycles of voltage source 18 and this tendency would cause an effective D. C. component of current to exist in the circuit. The point A on the curve shown in Fig. 2 would therefore be changed, causing the firing time of the reactor to vary with variations in the D. C. component of current. Capacitor 19 serves to eliminate this effective D. C. component of current because D. C. current cannot flow through a capacitor.

Control circuit 10 is used as a grid control circuit for the vapor electric valve 26. Valve 26 has an anode 27, a control grid 28, and a cathode 29 shown as a mercury pool cathode but which may be of the hot cathode type. Resistor 20 is connected between the grid 28 and cathode 29 through a grid current limiting resistor 31 and a source of unidirectional bias shown as a battery 32 having its positive terminal connected to the cathode 29. If the valve is to be operated without a bias, battery 32 may be omitted.

The operation of the circuit shown in Fig. 1 is as follows: The magnetic characteristics of reactor 11 are approximated by the three linear parts of the curve shown in Fig. 2. This approximation neglects the magnetizing current for flux densities below saturation and the self-inductance for flux densities in the saturation range.

The premagnetizing effect of winding 12 is aided by the flow through winding 17 of positive current, that is current flowing through resistor 20 in the nonconductive direction of rectifier 21. It is opposed by negative current, which flows in the opposite direction through rectifier 21 and thus bypasses resistor 20.

Figure 2:
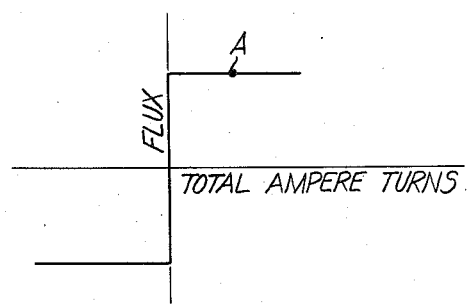
Fig. 2 shows the approximated magnetization characteristics of the reactor shown in Fig. 1.

The source 13 supplies an adjustable unidirectional current to control winding 12 which saturates the core of reactor 11 to a point such as point A on the curve in Fig. 2. Source 18 supplies an alternating voltage assumed to be of sinusoidal wave shape represented by curve 33 of Fig. 3.

At any time:

$$e = e_L + e_C + e_R$$

where:

$e$ is the applied voltage of source 18
$e_L$ is the induced voltage of winding 17 of reactor 11
$e_C$ is the voltage across capacitor 19
$e_R$ is the voltage across resistor 20.

Figure 3:
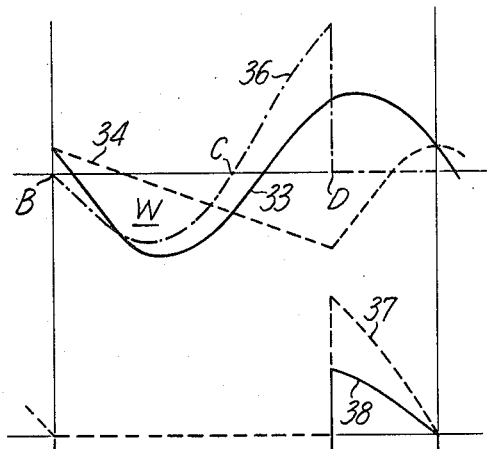
Fig. 3 shows various current and voltage waves of the circuit of Fig. 1.

It was found experimentally that at some time during the cycle, such as the time represented by point B, the supply voltage is equal to the voltage across the capacitor 19 which is shown by curve 34 in Fig. 3. Immediately before point B the applied voltage $e$ is more positive than the capacitor voltage $e_C$, the current is positive and reactor 11 is therefore saturated. Since $e_L=0$ when the reactor is saturated, the conditions of the circuit from the above equation are given by $$e=e_C+e_R$$

or $$e-e_C=e_R$$

At point B the applied voltage $e$, whose slope is negative at that instant, becomes smaller than the capacitor voltage $e_C$. The difference $e-e_C$ becomes negative causing the direction of the current to reverse. The current then passes through rectifier 21 with practically no voltage drop. Immediately following point B, $e_R=0$ and since reactor 11 is still saturated $e_L=0$. The conditions of the circuit are then given by $$e=e_C$$

The difference between $e$ and $e_C$ becomes more negative and would cause an abrupt rise of current in the negative direction to a value given by $$i=C\frac{de}{dt}$$

if it were not limited by reactor 11. When the ampere turns of winding 17 reach a value equal and opposite to the ampere turns of winding 12 any tendency of the current to further increase in the negative direction causes a rapid change in flux which results in reactor 11 absorbing that part of the applied voltage which is not across capacitor 19, the conditions now being given by $e=e_L+e_C$. The current remains practically constant and is shown as curve 35 in Fig. 3. The voltage across the capacitor 19 must be a straight line since $$\frac{d}{dt}e_C=\frac{i}{C}=\text{constant}$$

The voltage across the reactor is given by $$e_L=e-e_C$$

It is represented by curve 36 negative from B to the time represented by point C. Reactor 11 is said to have absorbed the volt second area W between curves 33, 34. The reactor is designed so that negative saturation is never reached.

Following time C the reactor voltage $e_L$ becomes positive and the flux starts to increase. This change of flux again takes place without a measurable change in current and the capacitor voltage therefore keeps following a straight line. Reactor 11 again reaches saturation at point D and loses its induced voltage.

The voltage difference $e-e_C$ is applied across resistor 20 and rectifier 21 and is shown by curve 37 in Fig. 3. Since this voltage is now highly positive the current is abruptly reversed as shown by curve 38.

The time D at which the reactor saturates and loses its induced voltage can be controlled by varying the premagnetizing current in winding 12 by changing the variable resistor 14. If the control current is increased the current $i$ during the interval BD is increased and causes a steeper slope of the capacitor voltage $e_C$ which results in an earlier firing time for valve 26. A reduced control current causes later firing.

The wave shape of the voltage across the resistor 20 indicates an ideal voltage for controlling an electroresponsive device which is operated by a steep front voltage wave.

The voltage wave across resistor 20 is applied to the grid 28 of tube 26, which is shown with a negative bias battery 32. As is well known, the valve is rendered conductive by the grid being biased to a predetermined value by the steep front voltage wave applied to it from resistor 20, provided that the wave substantially exceeds the negative bias voltage of battery 32. The resistor 31 limits the current in the grid circuit when the grid is positive with respect to cathode 29.

When the valve is not conducting it is possible for negative grid current to flow through resistors 31 and 20 and battery 32. Negative grid current is a function of the ionization conditions in the valve which is in turn a function of the load. If the elements of circuit 10 are properly dimensioned negative grid current will cause only a slight change in the phase relationship of the input voltage of source 18 and the output voltage across resistor 20 of the circuit of Fig. 1. That is, the time D at which the reactor loses its induced voltage is advanced slightly relative to the condition when negative grid current is not flowing. This grid current causes a relatively small voltage drop across resistor 20 but does not affect the current in winding 17 since capacitor 19 blocks the flow of direct current in that circuit. The small drop across resistor 20 decreases the value to which capacitor 19 is charged by source 18. The reactor thus has less voltage to absorb and release over one cycle and therefore D is advanced slightly. If the current in circuit 10 is several times larger than the maximum negative grid current the maximum shift in phase relation of the gird voltage front with respect to the source voltage 18 is about three electrical degrees at any load. This slight shift will not appreciably affect the operation of the valve.

If source 32 has a negligible impedance and the impedance of inductive winding 17 is large compared to the impedance of resistor 20 and rectifier 21 in parallel, capacitor 19 may be omitted. Under these conditions only a negligible amount of negative grid current flows in the circuit of inductive winding 17 and the circuit then operates substantially as the circuit of Fig. 1.

When the unidirectional control current for reactor 11 and the bias source 32 are made proportional to the input voltage 18, the phase relation between the input voltage 18 and output control grid voltage is independent of the amplitude of the input voltage. This condition is satisfied in most practical cases since source 13 and bias source 32 consist of a common alternating supply associated with transformers and rectifiers as shown in Fig. 4, in which battery 13 is replaced by transformer 41 and rectifier 42 and source 32 is replaced by transformer 43 and rectifier 44.

Figure 4:
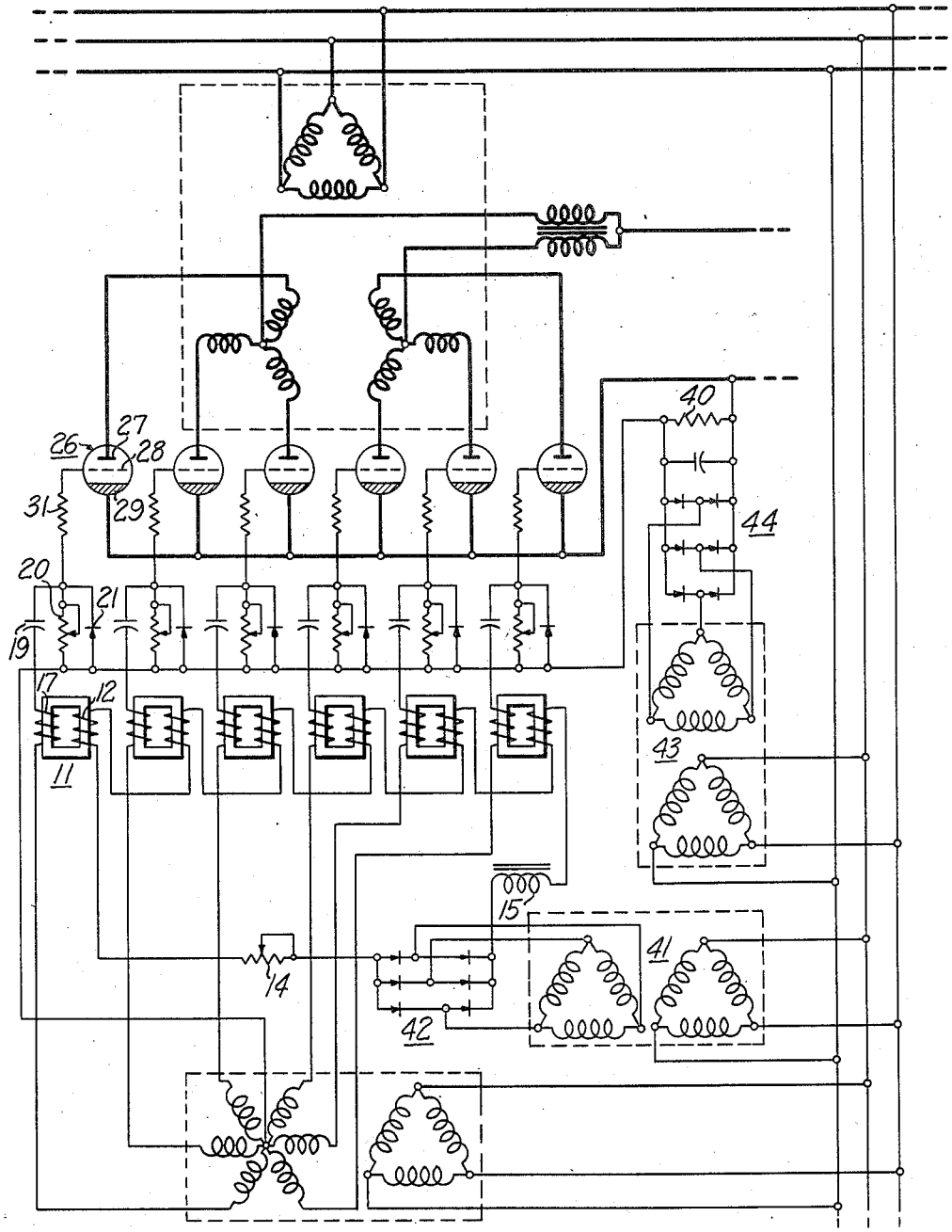
Fig. 4 shows diagrammatically a current conversion system comprising the circuits of a six phase rectifier embodying the control arrangement of Fig. 1.

The operation of the circuit shown in Fig. 4 is similar to that of the circuit shown in Fig. 1. The use of a common bias source such as a rectifier 44 with a bypass resistor 40, has the effect that the bias voltage is to some extent dependent on the proportion between positive and negative grid currents. Positive grid current from one grid passes through the resistor 40 and causes a voltage drop which increases the negative bias voltage of the other grids. The result is that the bias voltage is larger if the grid current is ideally rectified than if the grids are short circuited to cathode. Since for the circuit of Fig. 1 the effect of the total bias on the phase relation of the grid voltage is very small, it may be concluded that the self-biasing effect is still smaller.

Although but two embodiments of the present invention have been illustrated and described, it will be apparent to those skilled in the art that various changes and modifications may be made without departing from the spirit of the invention or from the scope of the appended claims.

It is claimed and desired to secure by Letters Patent:

1. In combination, an ionic valve provided with an anode, a cathode and a control element operable to render said valve conductive in response to a steep front voltage wave, and circuit means for impressing between said element and said cathode a relatively steep front voltage wave, said circuit means including a saturable core reactor having an inductive winding and a control winding, a resistor having first and second terminals, means connecting said first terminal to said element, means connecting second terminal to said cathode, means associated with said control winding to presaturate said reactor to a predetermined value, a series circuit including a source of alternating voltage, said inductive winding and said resistor, a unidirectional current conductor connected in parallel with said resistor with the positive pole of said conductor connected to said first terminal, said resistor and said conductor defining a parallel branch in said series circuit, and a capacitor disposed in said series circuit in series with said parallel branch.

2. In combination, an ionic valve provided with an anode, a cathode and a control element operable to render said valve conductive in response to a steep front voltage wave, and circuit means for impressing between said element and said cathode a relatively steep front voltage wave, said circuit means including a saturable core reactor having an inductive winding, a resistor having first and second terminals, means connecting said first terminal to said element, means connecting second terminal to said cathode, means associated with said reactor to presaturate said reactor to a predetermined value, a series circuit including a source of alternating voltage, said inductive winding and said resistor, a unidirectional current conductor connected in parallel with said resistor with the positive pole of said conductor connected to said first terminal, said resistor and said conductor defining a parallel branch in said series circuit, and a capacitor disposed in said series circuit in series with said parallel branch.

3. In combination, an ionic valve provided with a grid and a cathode, and a grid control circuit for impressing between said grid and said cathode a steep front voltage wave to initiate conduction of current through said valve, said circuit including a resistor having first and second terminals, means connecting said first terminal to said grid, means connecting said second terminal to said cathode, a unidirectional current conductor connected in parallel with said resistor with the positive pole of said conductor connected to said first terminal, a saturable core reactor having an inductive winding and a control winding, a capacitor connected between one end of said inductive winding and said first terminal, a source of voltage connected between the other end of said inductive winding and said second terminal, and means associated with said control winding to presaturate the core of said reactor to a predetermined extent.

4. An electric current conversion system comprising a supply circuit, a load circuit, an ionic valve connected between said circuits for translating energy therebetween, said valve including an anode, a cathode, and a control grid for controlling the energy translated through said valve, and means for supplying to said grid a steep front voltage wave to render said valve conductive comprising a circuit including a source of alternating voltage, a saturable core reactor having an inductive winding, and a resistor, means connecting said resistor between said grid and said cathode, means for presaturating said saturable core reactor to a predetermined value to cause said steep front voltage wave to be formed across said resistor at a predetermined time with relation to said alternating voltage, means for minimizing variations in said predetermined value caused by the flow of negative grid current through said resistor comprising a unidirectional current conductor connected in parallel with said resistor, said resistor and said conductor defining a parallel branch causing more current to flow through said branch in one direction than in the other direction to oppose said negative grid current, and a capacitor connected in series with said inductive winding and said parallel branch.

References Cited in the file of this patent
UNITED STATES PATENTS

| | | |
|---|---|---|
| 2,160,688 | Teare | May 30, 1939 |
| 2,517,131 | Phillipi | Aug. 1, 1950 |